Sept. 29, 1942.  R. L. OVERSTREET  2,297,018
SPONGE RUBBER AND PROCESS OF MAKING SAME
Filed Feb. 3, 1939
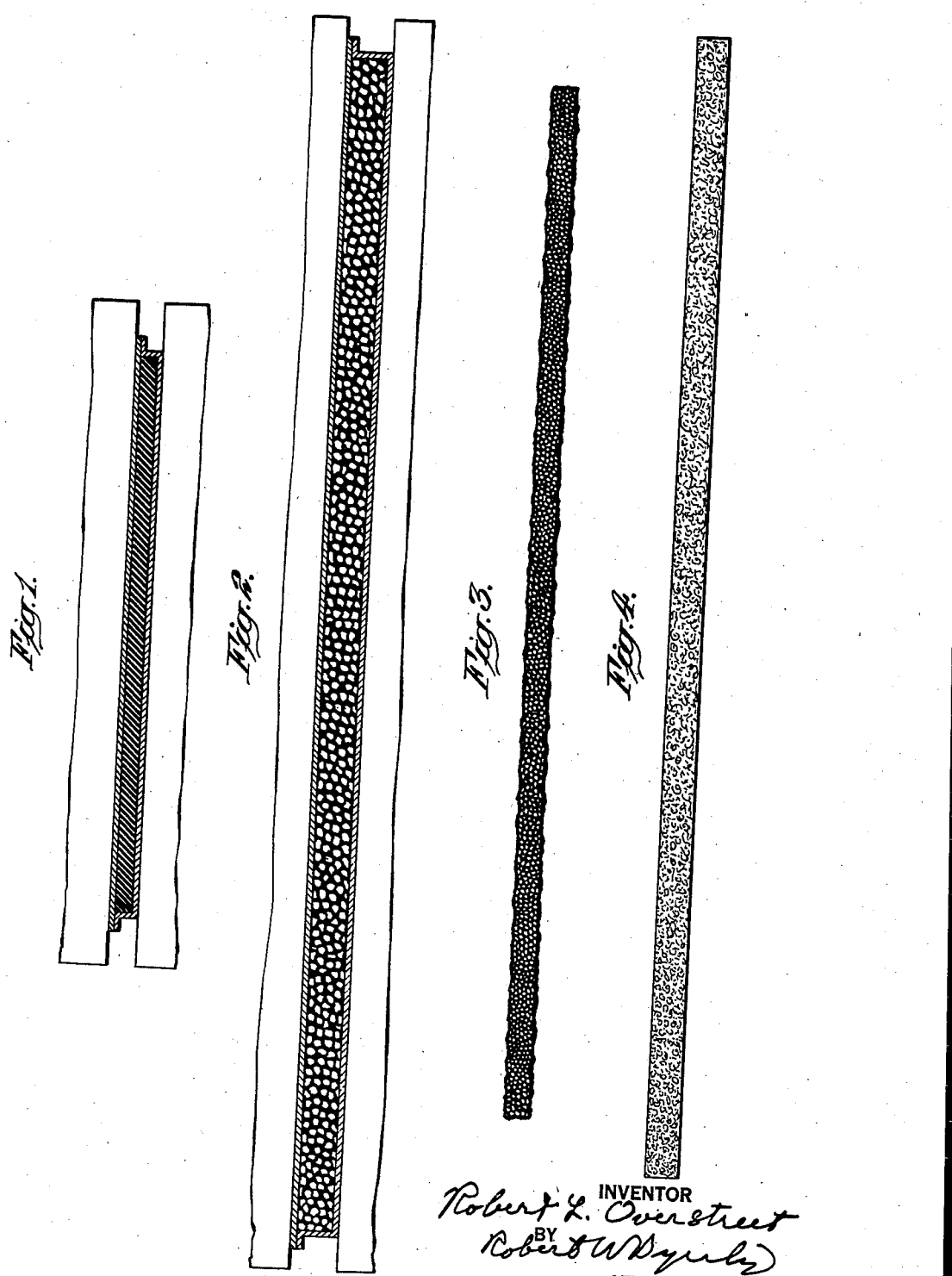

Patented Sept. 29, 1942

2,297,018

UNITED STATES PATENT OFFICE 2,297,018

SPONGE RUBBER AND PROCESS OF MAKING SAME

Robert L. Overstreet, Bedford, Va., assignor, by mesne assignments, to Salta Corporation, Jersey City, N. J., a corporation of Delaware Application February 3, 1939, Serial No. 254,353

4 Claims. (Cl. 18—53)

This invention relates to sponge rubber articles and a process of making the same. The new sponge rubber articles are lighter and softer than any that have been previously made. The method of making them is economical and certain, producing articles of predetermined shape and density.

Sponge rubber is ordinarily made by incorporating a blowing agent with a rubber compound and then heating a mass of the compound to vulcanize the rubber and develop gas within it from the blowing agent. The gas is allowed to escape during vulcanization so that an open-cell structure is produced. The lightest sponge rubber made by this method weighs about 14 pounds to the cubic foot.

Soft cellular rubber with closed cells has been made much lighter than this by means of the so-called gassing method, in which the rubber compound is subjected to a neutral gas under very high pressure. This process is very expensive in comparison with ordinary methods of making sponge rubber, and the closed-cell rubber made by it cannot be used for many of the purposes for which sponge rubber is desired.

My method involves expanding a mass of rubber compound by any usual blowing agent. It differs from the ordinary method of making sponge rubber in that the expansion is controlled by rigid external confinement. During the first part of the vulcanization, the rubber compound is confined in a mold having an internal volume no greater than the ordinary volume of the compound. This prevents any substantial evolution of gas within the rubber compound during the first part of the vulcanization and until the rubber compound has acquired a consistency and tensile strength sufficient to prevent entrapped gas from rupturing it. During the latter part of the vulcanization, the rubber compound is placed in a mold having the size and shape of the sponge rubber article to be made. On release from the first mold or during the final vulcanization in the larger mold, or at both of these times, the mass is expanded by gas produced by the blowing agent, so that at the end of the vulcanization there is produced a closed-cell soft cellular rubber article having the shape and size of the second mold. As first made by completion of the vulcanization, the article is useless, since the gas produced from ordinary blowing agents is of such an unstable character that, on cooling a closed cell product blown with it, the gas is condensed or in some way chemically eliminated from the cells so that the article collapses and returns nearly to the size of the compound before expansion. In accordance with my method, the apparently useless article produced at the end of the final vulcanization is made into a valuable open-cell sponge rubber article having the size and shape of the second mold. I effect this change by bursting the closed cells by subjecting the article to a severe squeezing action while a substantial amount of gas is contained in the cells, so that the gas is compressed to the point where it bursts the cells. The bursting of the cells is best effected while the mass is hot, or, at least, warm. It is most desirably done immediately after the completion of the vulcanization before the mass has fully cooled, so that a substantial proportion of the gas produced by the blowing agent during the vulcanization remains in the cells. When more convenient, however, the mass may be allowed to cool and collapse after the vulcanization, and then may be reheated for the cell-bursting operation. The reheating has the effect of regenerating gas within the cells of the mass so that this gas may be used in bursting the cells. The severe squeezing used to effect the bursting may most conveniently be obtained by passing the mass between rollers such as those of an ordinary rubber mill.

The shape of the sponge rubber article made by my method is predetermined by the shape of the second mold. The density of the article is predetermined by the relation between the volumes of the first and second molds. The second mold has the important function of preventing expansion beyond the point at which the cells remain closed. I have found that it is practicable to make the volume of the second mold as much as eighteen or twenty times the volume of the first mold. This produces a rubber article as light as 6 pounds to the cubic foot, which is less than half the weight of the sponge rubber previously made by the use of blowing agents and very much lighter than the sponge rubber recently made from aerated latex.

The new sponge rubber may be made of true rubber or from rubber substitutes such as "Neoprene."

In order that my invention may be fully understood, I will describe specific methods embodying my invention and the products resulting therefrom. In the description, I shall refer to the accompanying diagrammatic drawing, in which:

Fig. 1 shows the rubber mass externally confined during the preliminary vulcanization;

Fig. 2 shows the expanded mass at the end of the final vulcanization;

Fig. 3 shows the condition of the mass just before the bursting of the cells; and Fig. 4 shows the condition of the mass after the cells have been burst.

The rubber compound used in my process may consist of any compound previously used for sponge rubber, except such as contain quick-acting accelerators which are undesirable in my method. Examples of appropriate compounds are as follows:

*Example I*

|  | Pounds | Ounces |
|---|---|---|
| Pale Crepe | 50 | |
| Diphenylguanidine | 0 | 4 |
| Sulfur | 2 | 8 |
| Calcene | 50 | |
| Zinc oxide | 50 | |
| Lithopone | 10 | |
| Agerite powder | 0 | 8 |
| Oleic acid | 5 | |
| Prenol A | 2 | 8 |
| Bicarbonate of soda | 20 | |
| Petrolatum | 5 | |
| Light calcined magnesia | 4 | |

*Example II*

| | Pounds |
|---|---|
| "Neoprene," type E | 100 |
| Light calcined magnesia | 10 |
| F. F. wood rosin | 5 |
| Cottonseed oil | 10 |
| Medium process oil | 15 |
| Sodium bicarbonate | 20 |
| Neozone D | 2 |
| Sulfur | 2 |
| Zinc oxide | 10 |

It will be noted that Example I is a true rubber compound, while Example II is a compound made with the rubber substitute "Neoprene." In both examples, the blowing agent is bicarbonate of soda, but it will be understood that any other blowing agent customarily used in the manufacture of sponge rubber may be substituted.

After the compound has been mixed, calendered and sheeted or slabbed, and it has been allowed to cool to room temperature, a mass of the compound is placed in a rigid mold in which it is closely confined, as shown in Fig. 1. The mass is then partially vulcanized to a point where the compound acquires a consistency and tensile strength sufficient to prevent entrapped gas from rupturing it. This may be accomplished by vulcanization for six minutes at 320° F. or fifteen minutes at 260° F., when the final thickness of the sponge rubber is to be about one inch.

After the partial vulcanization, the mass is removed from the mold while still hot. It immediately expands to many times its original volume. It is then placed in a larger mold having the shape of the sponge rubber article to be made, and the vulcanization is completed in this mold. This may be accomplished by heating at a temperature of 298° F. for thirty-five minutes or a temperature of 331° F. for fifteen minutes, when the thickness of the sponge rubber product is to be about one inch. During the final vulcanization, the mass expands to completely fill the larger mold, as shown in Fig. 2. The mold limits the expansion to that which can be attained without bursting any substantial number of the cells. It also predetermines the shape and size of the sponge rubber article to be made.

After completion of the final vulcanization, the mold is most desirably cooled to about 200° F. before it is opened for removal of the mass. This cooling eliminates the pressure which the expanded mass exercised against the walls of the mold at the end of the final vulcanization and thus prevents a further expansion of the mass on the opening of the mold which might tear the product. As soon as the mass is removed from the mold and exposed to room temperature, it starts to cool and to shrink. Before it has fallen below a temperature of 150° F., at which point it has shrunk to about 50 per cent. of the volume which it had at the end of the vulcanization, it is subjected to a severe squeezing action to burst the cells. This may be accomplished by passing it three or four times between rolls set at .200 inch apart and gradually brought in to .150 inch apart. This causes the gas in the cells to burst the cells. As soon as the cells are burst, air enters them and the mass re-expands approximately to the volume which it had on completion of the final vulcanization and re-acquires the shape of the mold in which the final vulcanization was effected. It retains this volume and this shape when completely cooled.

The result is an open-cell sponge rubber article of predetermined shape and density. With both the compounds above mentioned, the density may be made not over 6 pounds to the cubic foot.

It will be understood that changes may be made in the specific procedure described without departing from my invention. Thus, the final vulcanization need not take place immediately after the preliminary vulcanization, but may as well be effected when the mass which has received preliminary vulcanization is cooled and stored before the final vulcanization. The times and temperatures of the heatings used for the final and preliminary vulcanization are subject to variation with changes in the compound used and should, of course, be increased if the thickness of the final product is greater than the one inch thickness for which vulcanization data has been given. Mechanical means other than bursting the cells by squeezing gas from them may be used for breaking the cell walls, although I know of no other method which is as quick and satisfactory.

What I claim is:

1. The method of making a sponge rubber article of predetermined shape and size, which comprises vulcanizing a mass of soft rubber compound containing a blowing agent in two stages in the first of which the compound is confined in a rigid mold having the same volume as the compound and in the second of which the mass is confined in a larger mold having a volume less than that to which the blowing agent can expand the mass at vulcanization temperature and having the shape and approximate size of the article to be made, and after completion of the vulcanization mechanically rupturing the walls of the cells.

2. The method of making a sponge rubber article of predetermined shape and size, which comprises vulcanizing and expanding a soft rubber compound containing a blowing agent in a rigid mold having the shape and approximate size of the article to be made, the size of the mold being less than the volume to which the blowing agent can expand the rubber at the vulcanization temperature so that the expanded rubber exerts a pressure on the mold at the end of the vulcanization, cooling the mold to a temperature at which the expanded rubber exerts no pressure on the mold, and then opening the mold and removing the expanded article and mechanically rupturing the walls of the cells of the article.

3. The method of making a light sponge rubber article of predetermined shape and size, which comprises confining a mass of soft rubber compound containing a blowing agent adapted to produce an unstable gas on heating in a mold having a volume substantially the same as that of the mass, heating the confined mass to vulcanize it to the point where it acquires a consistency and tensile strength sufficient to prevent entrapped gas from escaping from the compound, placing the partially vulcanized mass in a larger mold and completing the vulcanization so as to produce a closed-cell cellular soft rubber article which collapses on cooling, and mechanically rupturing the walls of the cells to admit air to the cells so that the article reacquires the shape and size of the second mold.

4. As a new article of manufacture, an open-cell sponge rubber in which the proportion of air-filled cells to rubber compound is such that the apparent density of the sponge rubber is less than 10 pounds to the cubic foot and in which the rubber compound contains approximately 25% by weight of rubber.

ROBERT L. OVERSTREET.